(12) United States Patent
Fischer et al.

(10) Patent No.: US 8,172,261 B2
(45) Date of Patent: May 8, 2012

(54) AIR BAG MODULE WITH ACTUATABLE VENT PART

(75) Inventors: Kurt F. Fischer, Leonard, MI (US); Annmarie McMillan, Romeo, MI (US); Mary C. Raska, Romeo, MI (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 1138 days.

(21) Appl. No.: 12/009,796

(22) Filed: Jan. 22, 2008

(65) Prior Publication Data

US 2008/0119992 A1    May 22, 2008

Related U.S. Application Data

(63) Continuation-in-part of application No. 10/942,549, filed on Sep. 16, 2004, now Pat. No. 7,334,814.

(51) Int. Cl.
*B60R 21/276* (2006.01)
(52) U.S. Cl. .................................. 280/739; 280/743.2
(58) Field of Classification Search ................. 280/739, 280/743.2
See application file for complete search history.

(56) References Cited

U.S. PATENT DOCUMENTS

| 5,413,378 | A  | * | 5/1995  | Steffens et al. | 280/735 |
| 5,695,214 | A  | * | 12/1997 | Faigle et al.   | 280/735 |
| 6,932,384 | B2 | * | 8/2005  | Waid et al.     | 280/739 |
| 7,240,917 | B2 | * | 7/2007  | Fogle et al.    | 280/739 |
| 7,431,336 | B2 | * | 10/2008 | Karlow et al.   | 280/739 |

* cited by examiner

*Primary Examiner* — Eric Culbreth
(74) *Attorney, Agent, or Firm* — Tarolli, Sundheim, Covell & Tummino LLP

(57) ABSTRACT

An apparatus (10*b*) includes an inflatable vehicle occupant protection device (14*b*). An inflation fluid source provides inflation fluid for inflating the protection device (14*b*). A structure (320) for supporting the protection device (14*b*) includes a vent opening (40*b*) for venting inflation fluid from the protection device. A vent member (300) is connectable to the structure (320) to block inflation fluid flow through the vent opening (40*b*). An actuatable device (120*b*) when actuated breaks the connection between the vent member (80*b*) and the structure (320) and moves the vent member away from the vent opening (40*b*) to permit inflation fluid venting. A flexible elongated member (350) has a first end (352) connected to the vent member (300) and a second end (354) connected to the structure (320). The member (350) secures the vent member (300) to the structure (320) after the connection between the vent member and the structure is broken.

15 Claims, 10 Drawing Sheets

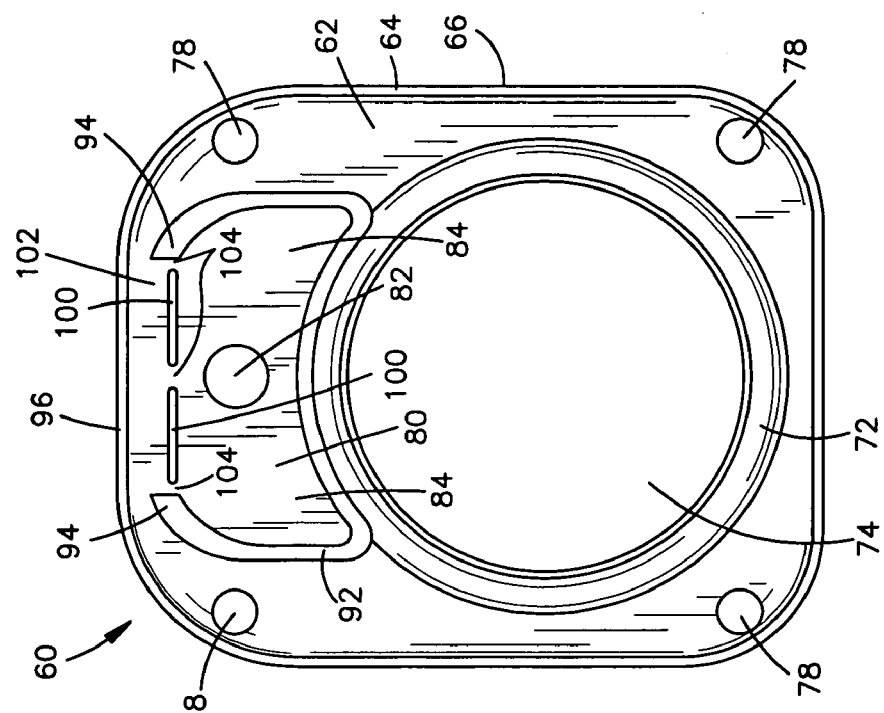
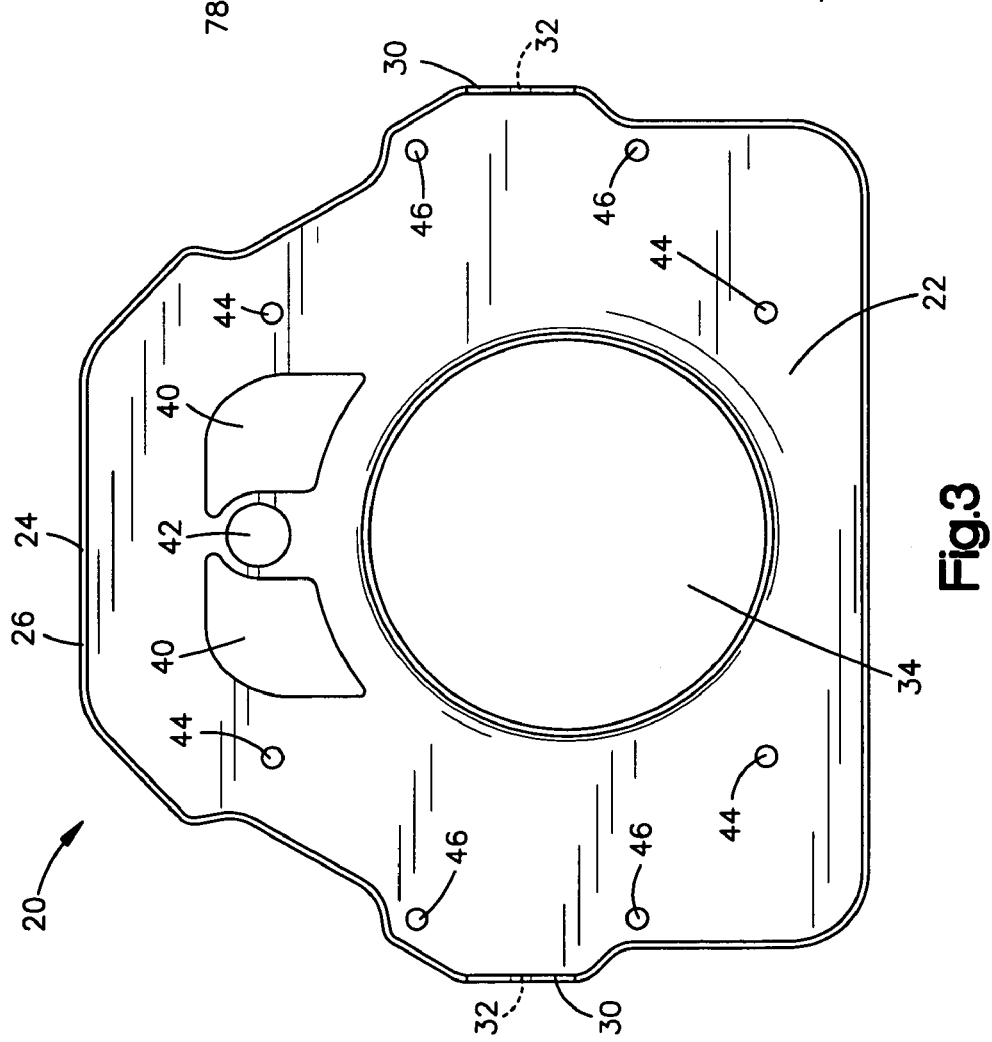

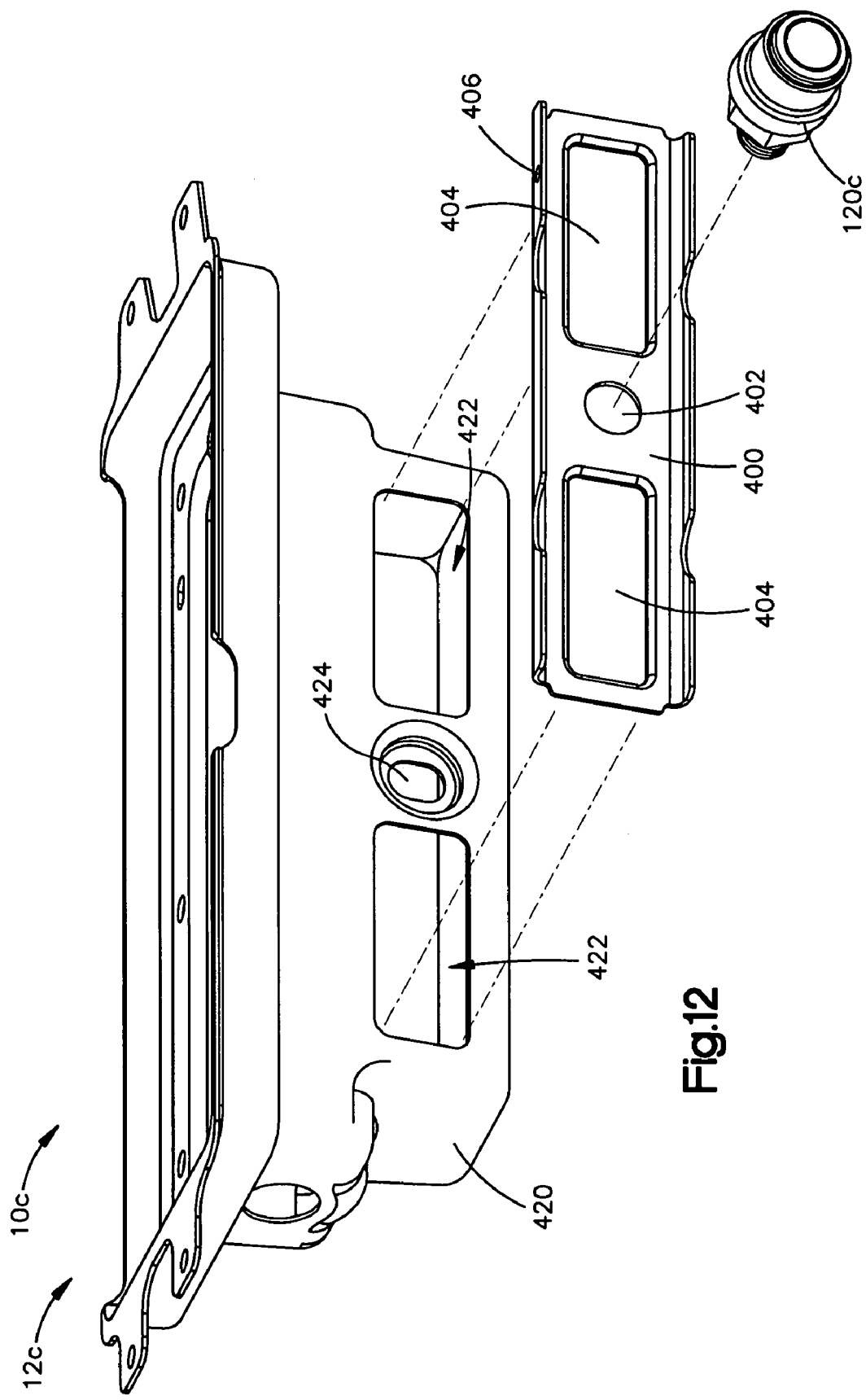

AIR BAG MODULE WITH ACTUATABLE VENT PART

RELATED APPLICATIONS

This application is a continuation-in-part of U.S. patent application Ser. No. 10/942,549, filed Sep. 16, 2004 now U.S. Pat. No. 7,334,814.

FIELD OF THE INVENTION

The present invention relates to a vehicle occupant protection apparatus. In particular, the present invention relates to an air bag module including a vent for releasing inflation fluid from the air bag.

BACKGROUND OF THE INVENTION

It is known to inflate an inflatable vehicle occupant protection device to help protect a vehicle occupant in the event of a vehicle collision. One particular type of inflatable vehicle occupant protection device is a front air bag inflatable by inflation fluid directed into the air bag from an inflator. A driver side front air bag is inflated from a stored position in a vehicle steering wheel to a deployed position between an occupant of a front driver side seat and the steering wheel and instrument panel of the vehicle. A passenger side front air bag is inflated from a stored position in the instrument panel to a deployed position between an occupant of a front passenger side seat and the instrument panel.

Another type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

Yet another type of inflatable vehicle occupant protection device is a side impact air bag inflatable between the side structure of the vehicle and a vehicle occupant. Side impact air bags may be stored in a variety of locations in the vehicle, such as the side structure, seat, door, or floor of the vehicle. A side impact air bag may be inflated by inflation fluid directed into the air bag from an inflator. Other types of inflatable vehicle occupant protection devices include inflatable seat belts and inflatable knee bolsters.

SUMMARY OF THE INVENTION

The present invention relates to An apparatus for helping to protect an occupant of a vehicle includes an inflatable vehicle occupant protection device. An inflation fluid source is actuatable to provide inflation fluid for inflating the protection device. A structure for supporting the protection device in the vehicle includes a vent opening for venting inflation fluid from the protection device. A vent member is connectable to the structure to block inflation fluid flow through the vent opening. Actuatable means is actuatable to break the connection between the vent member and the structure and move the vent member away from the vent opening to permit inflation fluid flow through the vent opening. A flexible elongated member has a first end connected to the vent member and a second end connected to the structure. The flexible elongated member secures the vent member to the structure after the connection between the vent member and the structure is broken.

The present invention also relates to an air bag module including an air bag and a reaction plate including at least one vent opening. A retainer is connectable with the reaction plate to clamp the air bag between the reaction plate and the retainer. An actuatable fastener has a first portion secured to the reaction plate and a second portion secured to a vent part to thereby connect the vent part to the reaction plate. The actuatable fastener is actuatable to move the vent part away from the at least one vent opening. A tether has a first end portion connected to the vent part and a second end portion connected to the reaction plate. The tether maintains a flexible connection between the vent member and the reaction plate after the actuatable fastener is actuated.

The present invention further relates to an air bag module including an air bag, a canister including at least one vent opening, a retainer connectable with the canister, and a vent part. An actuatable fastener has a first portion secured to the vent part and a second portion secured to the canister to thereby connect the vent part to the canister. The actuatable fastener is actuatable to move the vent part away from the at least one vent opening. A tether has a first end portion connected to the vent part and a second end portion connected to the canister. The tether maintains a flexible connection between the vent member and the canister after the actuatable fastener is actuated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a plan view of a reaction plate portion of the apparatus of FIGS. 1 and 2;

FIG. 4 is a plan view of a retainer portion of the apparatus of FIGS. 1 and 2;

FIG. 12 is a perspective view of portions of an apparatus comprising an air bag module including a vent, according to a fourth embodiment of the present invention.

DETAILED DESCRIPTION OF THE INVENTION

The present invention relates to an apparatus for helping to protect an occupant of a vehicle. In particular, the present invention relates to an inflatable vehicle occupant protection device module that has a vent that is actuatable from a closed condition to an open condition to vent inflation fluid from the protection device.

Figure 1:
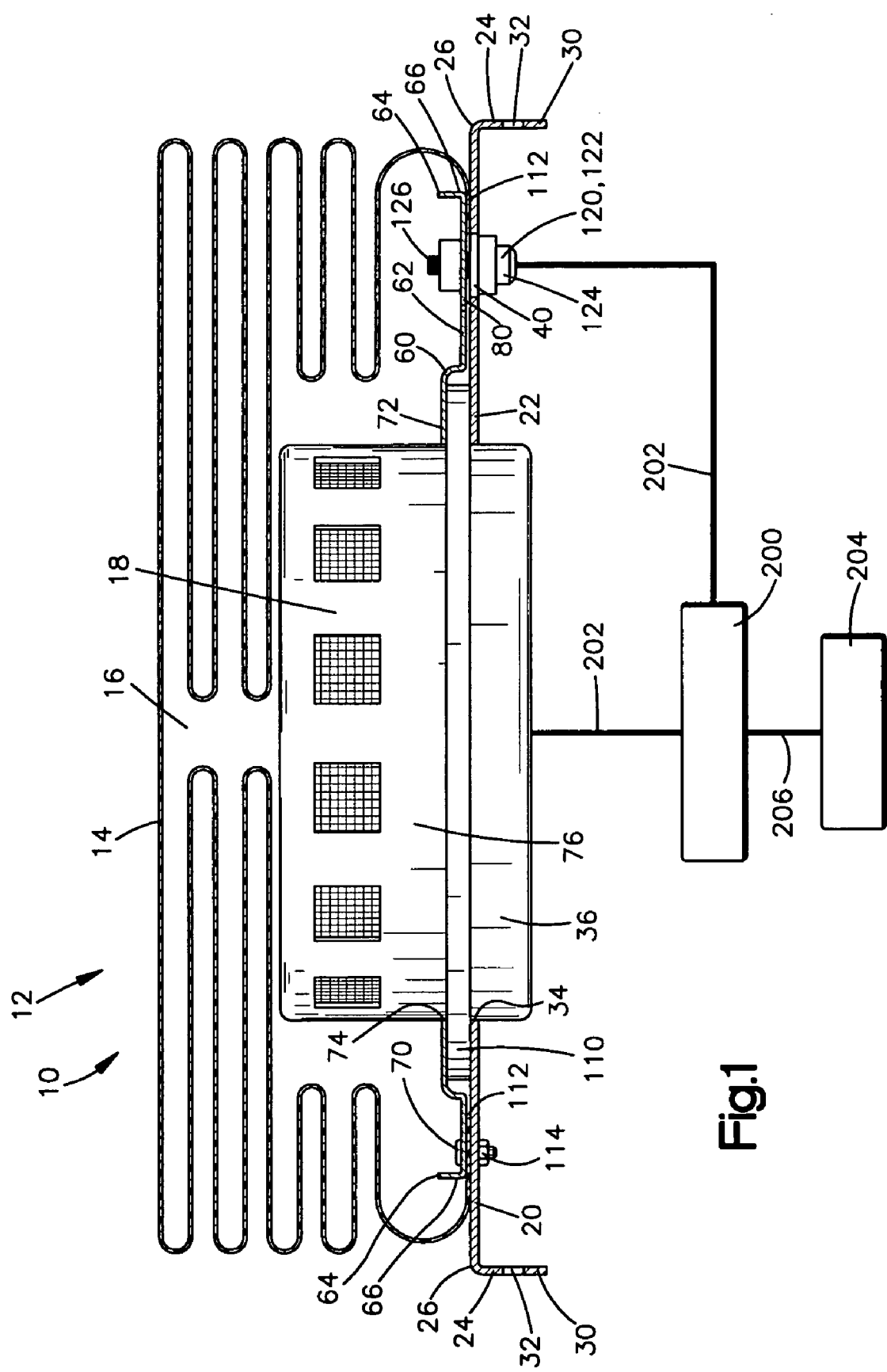
FIG. 1 is a side view, partially in section, of an apparatus including an inflatable vehicle occupant protection device in a deflated and stored condition and a vent in a closed condition, according to a first embodiment of the present invention.
Figure 2:
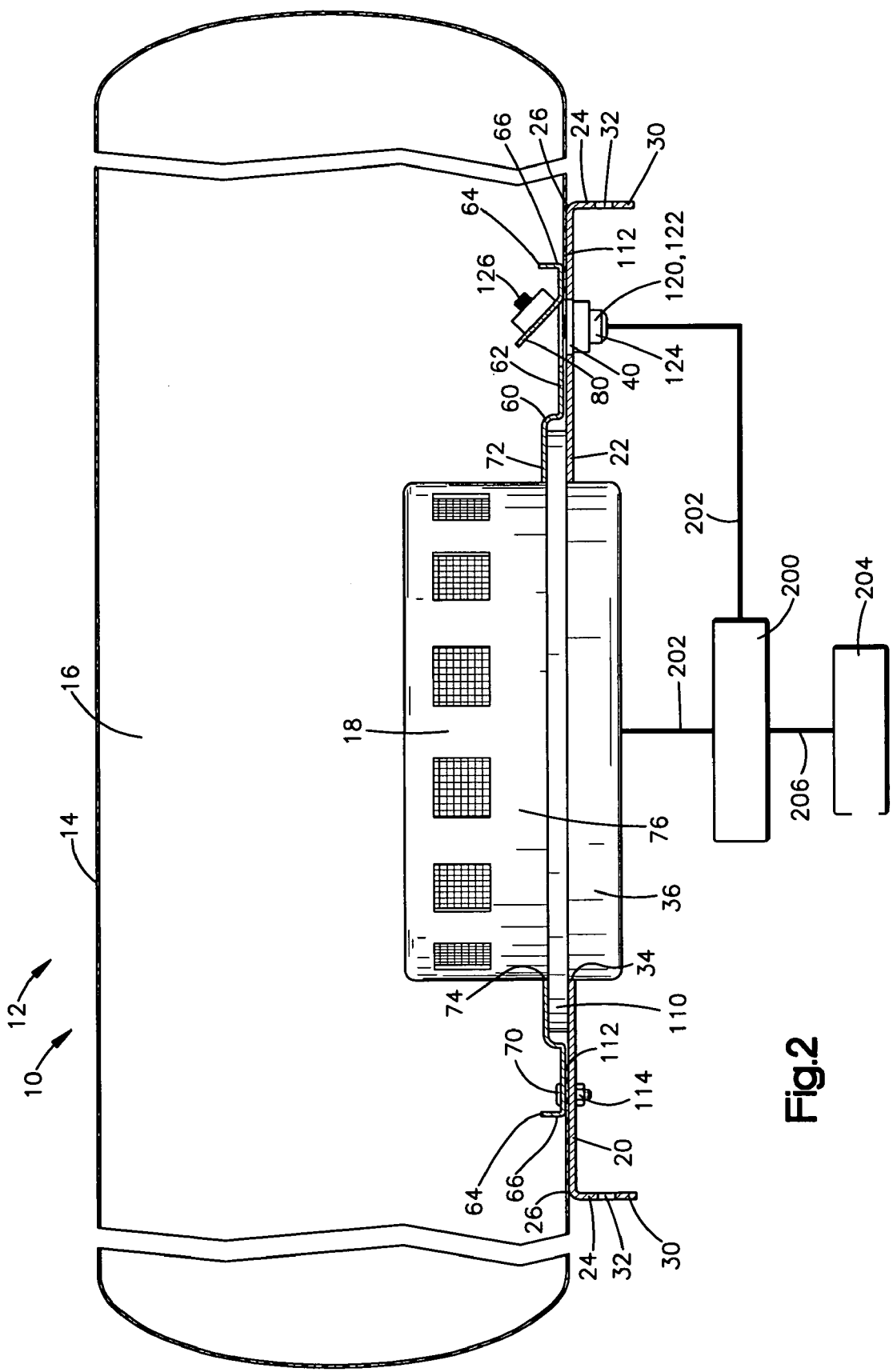
FIG. 2 is a view of the apparatus of FIG. 1 illustrating the inflatable vehicle occupant protection device in an inflated and deployed condition and the vent in an open condition.

As representative of the invention, FIGS. 1 and 2 illustrate schematically an apparatus 10 for helping to protect an occupant of a vehicle (not shown). In the embodiment of FIGS. 1 and 2, the apparatus 10 comprises an air bag module 12 that includes an inflatable occupant protection device in the form of an air bag 14. The apparatus 10 could, however, comprise other vehicle occupant protection devices that can be used in accordance with the invention. For example, the apparatus 10 could comprise inflatable seat belts, inflatable knee bolsters, inflatable head liners, inflatable side curtains, and knee bolsters operated by inflatable air bags.

The air bag module 12 of the illustrated embodiment is a front impact air bag module mountable on a driver side or passenger side of a vehicle. For example, in a driver side implementation, the air bag module 12 may be mounted on a steering wheel of the vehicle. In a passenger side implementation, the air bag module 12 may be mounted in an instrument panel of the vehicle.

The air bag 14 is preferably made from a flexible fabric material, such as woven nylon, and has an inflatable volume 16. The nylon may be coated with a gas impermeable material, such as urethane, or laminated with a gas impermeable film. The air bag 14 thus may have a substantially gas-tight construction. Those skilled in the art will appreciate that alternative materials, such as woven polyester, and alternatives coatings, such as silicone, may also be used to construct the air bag 14.

The air bag module 12 includes an inflator 18 for inflating the air bag 14. The inflator 18 may contain a stored quantity of pressurized inflation fluid and an ignitable material for heating the inflation fluid. The air bag module 12 alternatively could include an inflator 18 that uses the combustion of gas generating material to generate inflation fluid in the form of gas to inflate the air bag 14. As another alternative, the inflator 18 may contain only a stored quantity of pressurized inflation fluid for inflating the air bag 14. As a further alternative, the inflator 18 could be of any suitable type for supplying a medium for inflating the air bag 14.

The inflator 18 and the air bag 14 are supported on a support member 20. The support member 20 is a member or assembly that is fixed in position on the vehicle, that supports the inflator 18 and the air bag 14, and that receives the reaction forces of the inflator and the air bag when the inflator is actuated. In the illustrated embodiment, the support member 20 is a reaction plate.

The reaction plate 20 is illustrated in FIG. 3. Referring to FIGS. 1-3, the reaction plate 20 is a single piece of material, such as metal or high strength plastic, that is formed to the illustrated configuration. It will be appreciated that the reaction plate 20 could have a variety of alternative configurations depending on various factors, such as the architecture of the vehicle in which the air bag module 12 is installed.

The reaction plate 20 has a main portion 22 with a rim or outer wall 24 that extends about a periphery 26 of the reaction plate in a direction downward (as viewed in FIGS. 1 and 2) from the main portion 22. The reaction plate 20 may also include tabs 30 spaced about the periphery 26 of the main portion 22 that project in the same downward direction from the outer wall 24. The tabs 30 may interface with portions of a vehicle (not shown) to help secure the module 10 in the vehicle. The tabs 30 may include apertures 32 for receiving fasteners (not shown) for further helping to secure the air bag module 12 in the vehicle.

The main portion 22 also includes a central opening 34 for receiving a portion of the inflator 18. In the embodiment of FIGS. 1-3, the central opening 34 has a generally circular configuration to receive a cylindrical portion 36 of the inflator 18. The central opening 34 could, however, have a different configuration for matching an inflator having a different construction.

The reaction plate 20 also includes vent openings 40 for releasing inflation fluid from the air bag module 12. In the embodiment shown in FIG. 3, the reaction plate 20 includes a pair of vent openings 40 positioned on opposite sides of an actuator receiving opening 42. The vent openings 40 have a contoured wing-shaped configuration arranged in a mirror-image fashion. The configuration, number, and arrangement of the vent openings on the reaction plate 20 could, however, be altered to provide a desired venting effect.

The reaction plate 20 also includes apertures 44 for cooperating with fasteners to help assemble the air bag module 12. The reaction plate 20 may further include apertures 46 for helping to secure the air bag module 12 in the vehicle.

The air bag module 12 also includes a retainer 60 that cooperates with the reaction plate 20 to help support the air bag 14 on the reaction plate. The retainer 60 is illustrated in FIG. 4. Referring to FIGS. 1, 2, and 4, the retainer 60 is a single piece of material, such as metal or high strength plastic, that is formed to the generally rectangular configuration with rounded corner portions illustrated in FIG. 4. It will be appreciated that the retainer 60 could have a variety of alternative configurations depending on various factors, such as the architecture of the vehicle in which the air bag module 12 is installed and the configuration of the reaction plate 20 with which the retainer cooperates.

The retainer 60 has a main portion 62 with a rim or outer wall 64 that extends about a periphery 66 of the reaction plate in a direction upward (as viewed in FIGS. 1 and 2) from the main portion 62. The main portion 62 of the retainer 60 may be adapted to receive means 70, such as studs or bolts, for helping to secure the retainer to the reaction plate 20. In the embodiment illustrated in FIG. 4, the retainer 60 includes four such means 70 positioned at or near respective corners of the retainer.

The retainer 60 also includes a generally cylindrical central portion 72 with a central opening 74 for receiving a portion of the inflator 18. In the embodiment of FIGS. 1, 2, and 4, the central portion 72 is raised from the main portion 62 of the retainer. The opening 74 has a generally circular configuration that receives a cylindrical portion 76 of the inflator 18. The central opening 74 could, however, have a different configuration for matching an inflator having a different construction.

The retainer 60 also includes a vent part 80 for blocking inflation fluid flow through the vent openings 40. In the embodiment shown in FIG. 4, the retainer 60 includes a single vent part 80 that includes a support portion 102 and a cover portion 84. The cover portion 84 includes a centrally located actuator receiving opening 82. The cover portion 84 has portions shaped to mimic the wing-shaped configuration of the vent openings 40 and that are positioned on laterally opposite sides of the opening 82. The configuration of the vent part 80 could, however, be altered, for example, to accommodate a particular configuration or arrangement of the vent openings 40.

The vent part 80 is partially defined by slots 92, 100 in the main portion 62 of the retainer 60 formed, for example, by cutting or stamping. A first slot 92 helps define the overall wing-like shape or contour of the cover portion 84 of the vent part 80. The first slot 92 has spaced end portions 94 positioned along an edge 96 of the vent part 80. A pair of second slots 100 are positioned between the end portions 94 and extend parallel to the edge 96.

The second slots 100 help define the support portion 102 of the vent part 80 and three hinge portions 104 of the vent part. The hinge portions 104 extend from the cover portion 84 to the support portion 102 and thereby connect the cover portion to the support portion.

In an assembled condition of the air bag module 12, the inflator 18 is positioned such that the portion 36 extends through the opening 34 and the portion 76 extends through the opening 74. In this position, a flange portion 110 of the inflator 18 is positioned between the main portion 22 of the reaction plate 20 and the central portion 72 of the retainer 60. A mouth portion 112 of the air bag 14 is positioned between the main portion 22 of the reaction plate 20 and the main portion 62 of the retainer 60.

In the assembled condition of FIGS. 1 and 2, the studs 70 extend through respective ones of the openings 44 in the reaction plate 20. Nuts 114 are screwed onto the studs 70, which causes the reaction plate 20 and retainer 60 to exert a clamping force on the air bag 14 and the inflator 18. The air bag 14 and inflator 18 are thus secured to the reaction plate 20 via the retainer 60.

The air bag module 12 also includes means for moving the vent part 80 in the form of an actuator 120. In the embodiment illustrated in FIGS. 1-5B, the actuator 120 comprises an actuatable fastener 122. The actuator 120 could, however, have alternative configurations. For example, the actuator 120 could comprise an electromechanical device, such as a solenoid (not shown). As another example, the actuator 120 could comprise a mechanical device, such as a spring loaded mechanism.

Figure 5A:
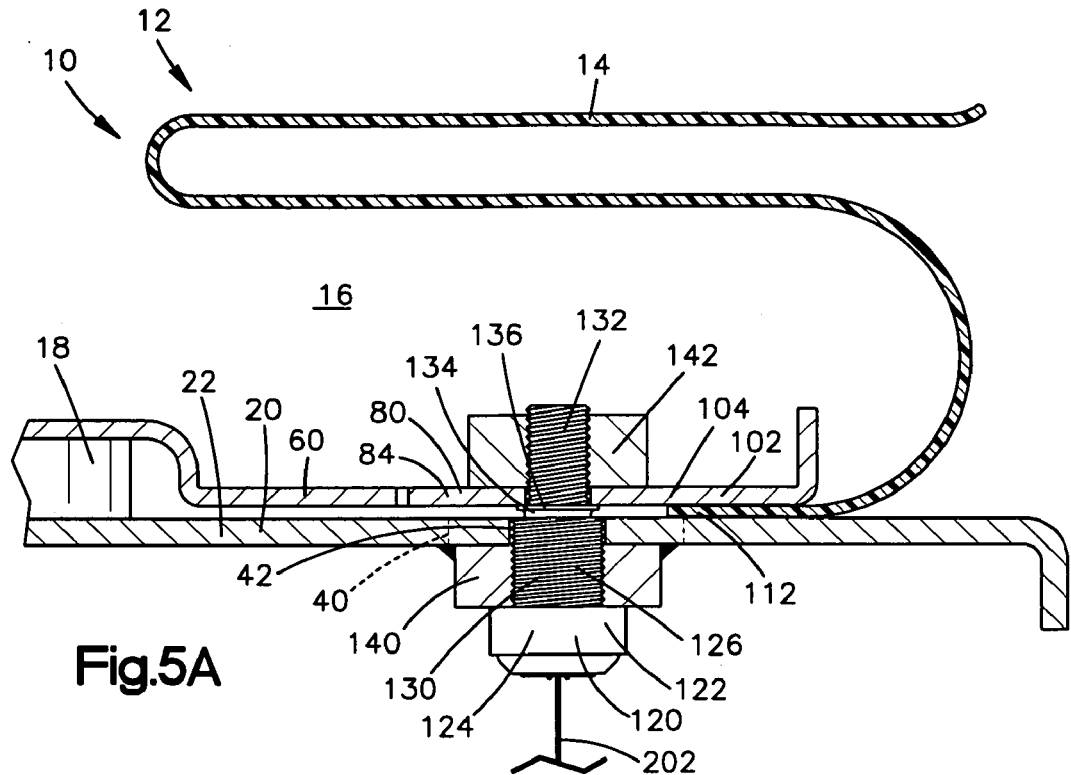
FIGS. 5A and 5B are magnified views of a portion of the apparatus of FIGS. 1 and 2, respectively.
Figure 5B:
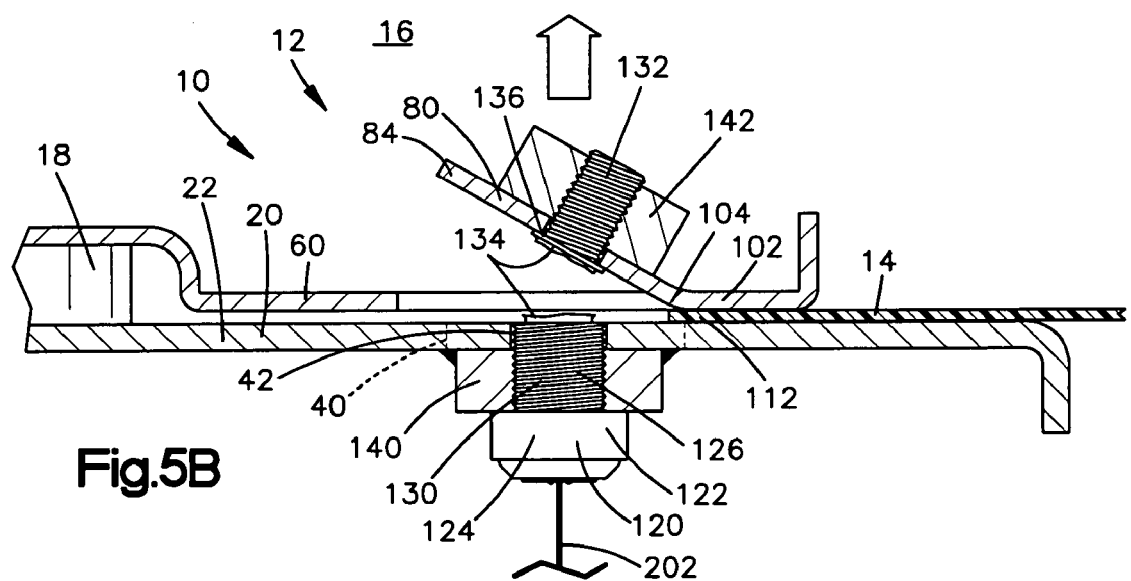

The actuatable fastener 122 includes a head portion 124 and a shank portion 126. Referring to FIGS. 5A and 5B, the shank portion 126 includes a first shank portion 130 and a second shank portion 132. The second shank portion 132 includes an annular shoulder portion 136 and is separated from the first shank portion 130 by an annular groove 134.

The first shank portion 130 is secured to the main portion 22 of the reaction plate 20 via a threaded nut 140 that is connected to the reaction plate by means, such as a weld. The shank 126 extends through the opening 42 in the main portion 22 of the reaction plate 20. The second shank portion 132 extends through the opening 82 in the cover portion 84 such that the shoulder portion 136 engages the cover portion. A nut 142 is screwed onto the second shank portion 132 to clamp the cover portion 84 between the shoulder portion 136 and the fastener. The cover portion 84 and, thus the vent part 80, are secured to the second shank portion 136 of the actuatable fastener 122.

The cover portion 84 of the vent part 80 is movable from an unactuated condition, illustrated in FIGS. 1 and 5A, to an actuated condition illustrated in FIGS. 2 and 5B. In the unactuated condition, the cover portion 84 overlies the vent openings 40 and thus helps block fluid flow through the openings. In the actuated condition, the cover portion 84 is moved away from the vent openings 40 and thus permits fluid flow through the openings.

The apparatus 10 also includes a controller 200 operatively connected to the actuator 120 and to the inflator 18 by means 202, such as lead wires. The controller 200 is operative selectively to actuate the inflator 18 and/or the actuator 120. The apparatus 10 also includes one or more sensors 204 operatively connected to the controller 200 via means 206, such as lead wires. The sensors 204 are operative to supply signals to the controller 200 indicative of sensed conditions, which the controller uses to determine whether to actuate the inflator 18 and/or actuator 120.

The sensors 204 may be operative to sense a variety of conditions of the vehicle and/or a vehicle occupant. For example, the sensors 204 may include vehicle collision and/or rollover sensors, occupant position sensors, seat position sensors, seat belt latch sensors, seat weight sensors, seat belt tension sensors, or any other sensors that may be useful in determining whether to actuate the inflator 18 and/or actuator 120.

Upon the occurrence of an event for which actuation of the inflator 18 is desired, such as a vehicle collision, the controller 200 is operative to actuate the inflator 18 to inflate the air bag 14. In this situation, the controller 200 is also operative selectively to actuate the actuator 120 to move the cover portion 84 of the vent part 80 between the unactuated and actuated conditions. The controller 200 determines whether to actuate the actuator 120 based on vehicle and occupant conditions sensed via the sensors 204. If, based on the conditions sensed via the sensors 204, the controller 200 determines the need to inflate the air bag 14 and maintain a relatively high inflation pressure for the air bag, the controller is operative to maintain the vent part 80 in the unactuated condition and thus does not actuate the actuator 120. If, based on the conditions sensed via the sensors 204, the controller 200 determines the need to reduce the inflation pressure in the air bag 14, the controller is operative to actuate the actuator 120 to move the vent part 80 to the actuated condition to permit inflation fluid to vent from the air bag 14 through the vent openings 40.

For example, the sensors 204 may provide signals to the controller 200 indicating that an occupant is in a normal seated position and restrained by a vehicle seat belt. If this situation is detected, the controller 200 may be operative to actuate the actuator 120 to move the vent part 80 to the actuated condition and vent inflation fluid from the inflatable volume 16 of the air bag 14. This venting of inflation fluid may provide a desired ride down effect for the inflatable curtain 14.

As another example, the sensors 204 may provide signals to the controller 200 indicating that an occupant is in a normal seated position but not restrained by a vehicle seat belt. If this situation is detected, the controller 200 may be operative to actuate the inflator 18 and block actuation of the actuator 120 so that the vent part 80 remains in the unactuated condition. This prevents inflation fluid from venting from the air bag 14, which allows the air bag to inflate fully and remain inflated throughout the duration of the collision. As a result, the air bag 14 may provide a high level of energy absorption for the unbelted occupant.

Those skilled in the art will appreciate that situations other than those set forth above may be sensed via the sensors 204 and used by the controller 200 to control operation of the inflator 18 and actuator 120. For example, the sensors 204 may provide information relating to sensed weight on the seat and sensed seat belt tension to estimate the size and position of the occupant. The controller 200 may then further control actuation of the inflator 18 and/or actuator 120 to provide the energy absorption characteristics required for the sensed occupant. As another example, seat belt tension and weight on the seat sensed by the sensors 204 may be used to detect the presence of a child safety seat.

According to the present invention, when the actuator 120 is actuated to place the cover portion 84 in the actuated condition, the vent part 80 undergoes plastic deformation at the hinge portions 104. The plastic deformation of the hinge portions 104 helps maintain the cover portion 84 in the actuated condition of FIGS. 2 and 5B. As a result, the need for additional means for maintaining the cover portion 84 in the actuated condition, such as latching mechanisms, can be eliminated.

Also, upon actuation of the actuator 120, the cover portion 84 moves in a direction upstream of the vent openings 40, i.e., in a direction generally into the inflatable volume 16 of the air bag 14. This is indicated generally by the arrow in FIG. 5B. Movement of the cover portion 84 in this direction can help avoid the need to provide a clearance for receiving the cover portion 84 in the area downstream of the vent openings 40. This may free up space for a variety of items, such as steering wheel structure and steering wheel mounted devices, such as electronics and switches.

The illustrated configuration of the vent part 80 may also be advantageous in scenarios where the cover portion 84 remains in the unactuated condition during inflation of the air bag 14. In these scenarios, the inflation fluid pressure in the inflatable volume 16 acts on the cover portion 84 and urges the cover portion against the reaction plate 20, which helps block leakage of inflation fluid through the vent openings 40.

Figure 6:
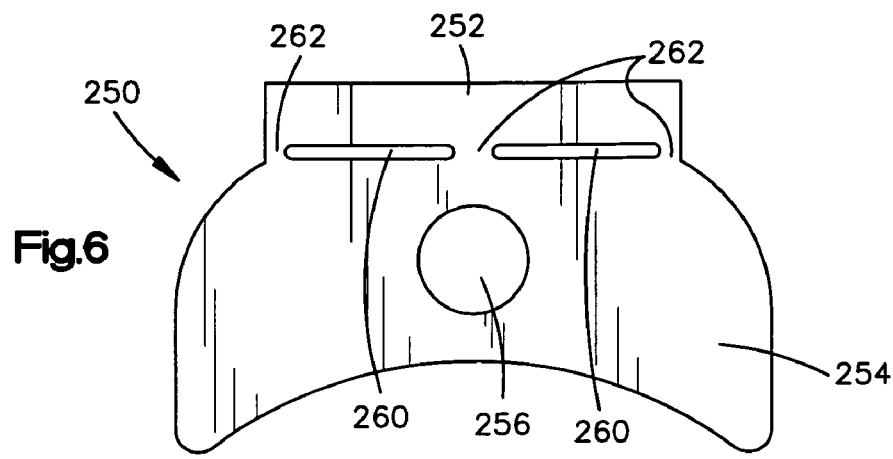
FIG. 6 is a plan view of a vent part construction for the apparatus, according to a second embodiment of the present invention.
Figure 7A:
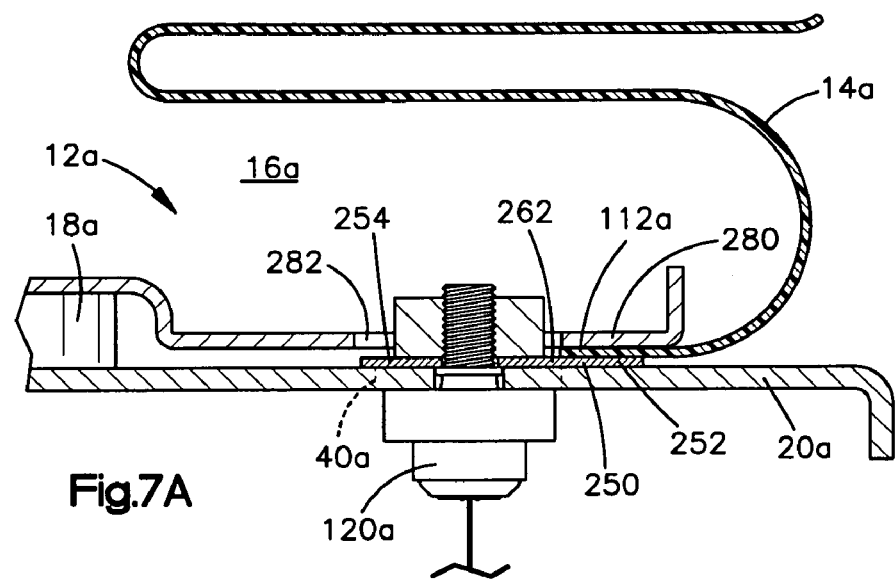
FIGS. 7A and 7B are magnified views of a portion of the apparatus including the alternative vent part of FIG. 6.
Figure 7B:
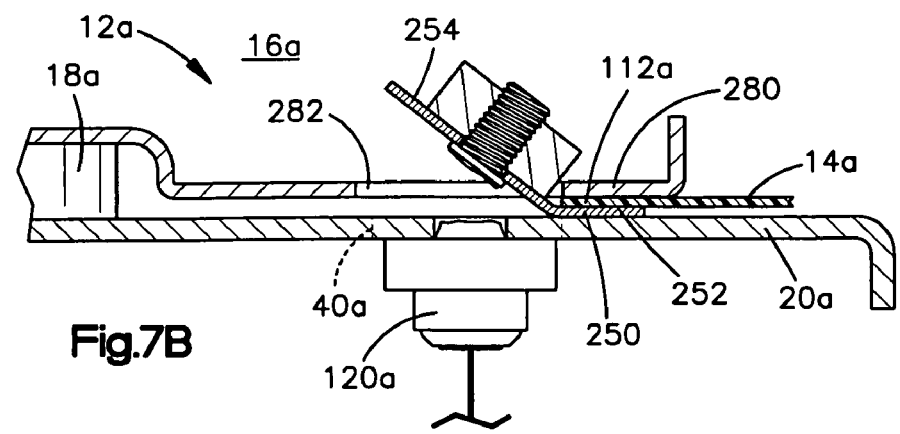
Figure 9:
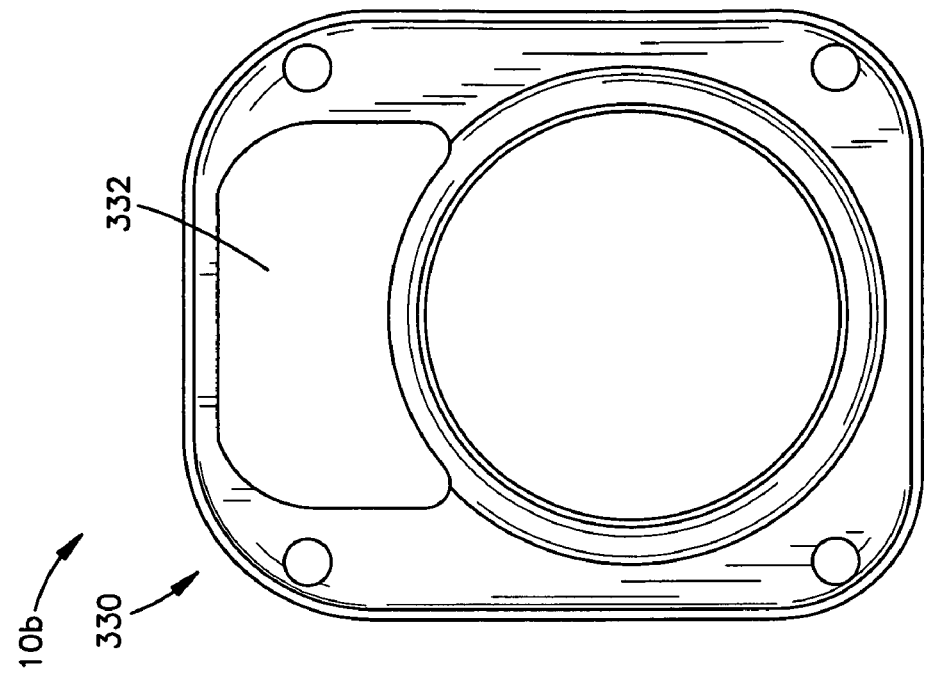
FIGS. 8-10 are plan views illustrating portions of an apparatus comprising an air bag module including a vent, according to a third embodiment of the present invention.
Figure 8:
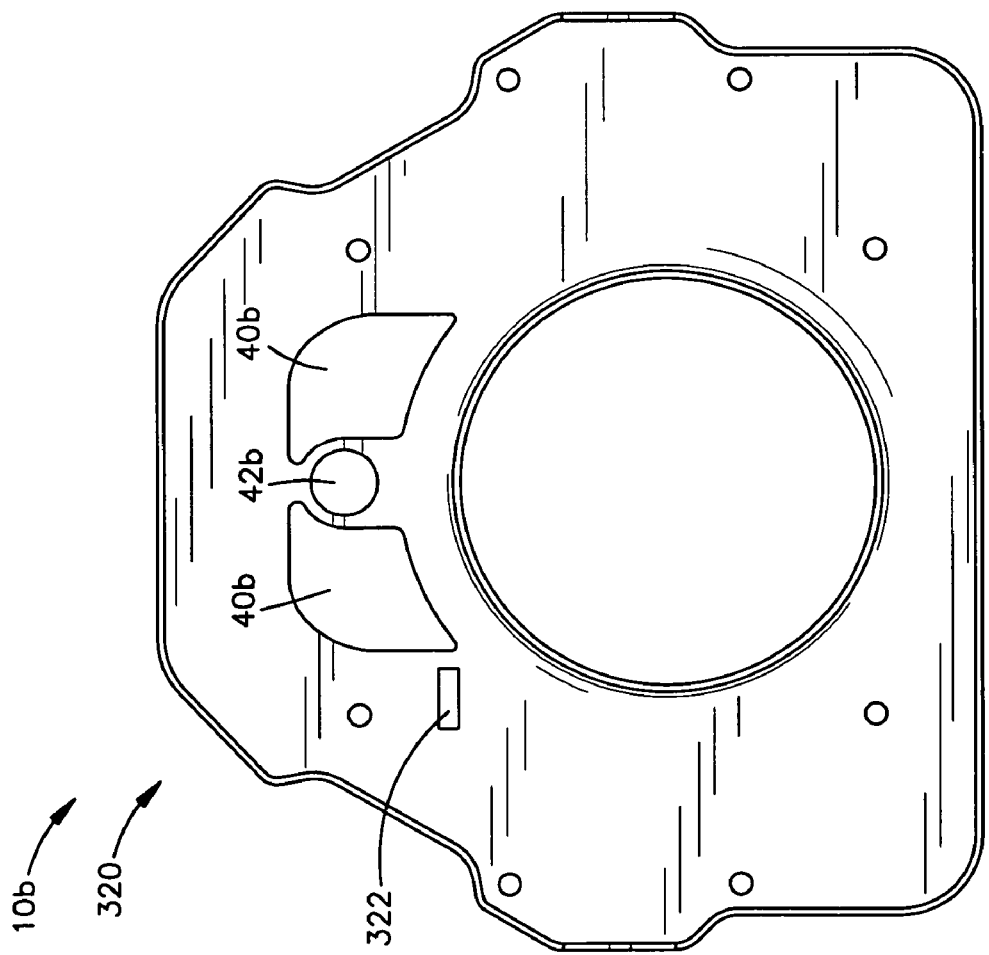
Figure 10:
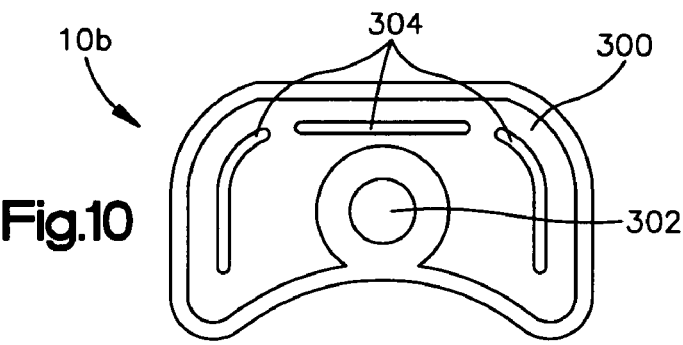

A second embodiment of the present invention is illustrated in FIGS. 6-7B. The second embodiment of the invention is similar to the first embodiment of the invention illustrated in FIGS. 1-5B. Accordingly, numerals similar to those of FIGS. 1-5B will be utilized in FIGS. 6-7B to identify similar components, the suffix letter "a" being associated with the numerals of FIGS. 6-7B to avoid confusion. The second embodiment of the present invention is similar to the first embodiment (FIGS. 1-5B), except that the vent part of the second embodiment is formed as piece of material separate from the reaction plate and retainer.

Referring to FIGS. 6-7B, the air bag module 12a includes a vent part 250 formed as a single piece of high strength material, such as metal or plastic. The vent part 250 is separate from the reaction plate 20a and a retainer 280 of the air bag module 12a. The retainer 280 of the second embodiment is similar to the retainer 60 of the first embodiment, except that the retainer 280 includes an opening 282 for accommodating the vent part 250. The vent part 250 of the second embodiment is actuatable from an unactuated condition (FIG. 7A) to an actuated condition (FIG. 7B).

The vent part 250 includes a support portion 252 and a cover portion 254. The cover portion 254 includes a centrally located actuator receiving opening 256. The cover portion 254 has portions shaped to mimic the wing-shaped configuration of the vent openings 40a and are positioned on laterally opposite sides of the opening 256. The configuration of the vent part 250 could, however, be altered, for example, to accommodate a particular configuration or arrangement of the vent openings 40a.

The vent part 250 includes pair of slots 260 that help define the support portion 252 of the vent part 250 and three hinge portions 262 of the vent part. The hinge portions 262 extend from the cover portion 254 to the support portion 252 and thereby connect the cover portion to the support portion.

Referring to FIGS. 7A and 7B, in an assembled condition of the air bag module 12a, the flange of the inflator 18a is positioned between the reaction plate 20a and the retainer 280. A mouth portion 112a of the air bag 14a and the support portion 252 of the vent part 250 are positioned between the reaction plate 20a and the retainer 280.

In the assembled condition, the retainer 280 is secured to the reaction plate 20a by means (not shown), such as the studs and nuts of the first embodiment (see, e.g., FIGS. 1 and 2). In doing so, the reaction plate 20a and retainer 280 exert a clamping force on the air bag 14a, inflator 18a, and support portion 252 of the vent part 250. As a result, the air bag 14a, inflator 18a, and vent part 250 are secured to the reaction plate 20 via the retainer 280.

The air bag module 12 also includes an actuator 120a for actuating the vent part 250. The actuator 120a may be an actuatable fastener secured to the vent part 250 and reaction plate 20 in a manner similar or identical to the actuator 120 of the first embodiment, as described above. In the unactuated condition (FIG. 7A), the cover portion 254 overlies the vent openings 40a and thus helps block fluid flow through the openings. When the actuator 120a is actuated to place the cover portion 254 in the actuated condition (FIG. 7B), the cover portion 254 is moved away from the vent openings 40a and thus permits fluid flow through the openings.

When the vent part 250 is placed in the actuated condition, the hinge portions 262 undergo plastic deformation. The plastic deformation of the hinge portions 262 helps maintain the cover portion 254 in the actuated condition. As described above, this may help avoid the need for additional means, such as latching mechanisms, for maintaining the cover portion 254 in the actuated condition.

Also, in the second embodiment, upon actuation of the actuator 120a, the cover portion 254 moves in a direction upstream of the vent openings 40a in a direction generally into the inflatable volume 16a of the air bag 14a. Movement of the cover portion 254 in this direction can help avoid the need to provide a clearance in the area downstream of the vent openings 40a.

Further, in the second embodiment, the inflation fluid pressure in the inflatable volume 16a acts on the cover portion 254 and urges the cover portion against the reaction plate 20a, which helps block leakage of inflation fluid through the vent openings 40a.

A third embodiment of the present invention is illustrated in FIGS. 8-11B. The third embodiment of the invention is similar to the embodiment illustrated in FIGS. 6-7B. Accordingly, numerals similar to those of FIGS. 6-7B will be utilized in FIGS. 8-11B to identify similar components, the suffix letter "b" being associated with the numerals of FIGS. 8-11B to avoid confusion.

The third embodiment of the present invention is similar to the embodiment of FIGS. 6-7B, except that the vent part of the third embodiment is formed as piece of material separate from the reaction plate and retainer and detaches from the reaction plate when the actuator is actuated. According to the third embodiment, the apparatus 10b includes a tether 350 that secures the vent part 300 to the air bag module 12b, e.g., to the reaction plate 320. The tether 350 may comprise any flexible elongated member, such as a fabric strap, a plastic strap, or a cable, suited to connect the vent part 300 to the air bag module 12b and permit relative movement between the vent part and the module.

Referring to FIGS. 8-11B, the vent part 300 of the air bag module 12b is formed as a single piece of material, such as metal or plastic. The vent part 300 is separate from the reaction plate 320 and the retainer 330 of the air bag module 12b. The reaction plate 320 of the third embodiment is similar to the reaction plate 20 of the first embodiment (see FIG. 3), except that the reaction plate 320 includes a tether opening 322 for accommodating the tether 350. The retainer 330 of the third embodiment is similar to the retainer 60 of the first embodiment (see FIG. 4), except that the retainer 330 includes an vent opening 332 for accommodating the separate vent part 300.

The vent part 300 is configured to fit within or pass through the vent opening 332 in the retainer 330. The vent part 300 has an actuator receiving opening 302 and support ribs 304 for helping to improve the strength of the vent part. The vent part 300 is shaped to mimic the wing-shaped configuration of the vent openings 40b in the reaction plate 320. The configuration of the vent part 300 could, however, be altered, for example, to accommodate a particular configuration or arrangement of the vent openings 40b.

Figure 11A:
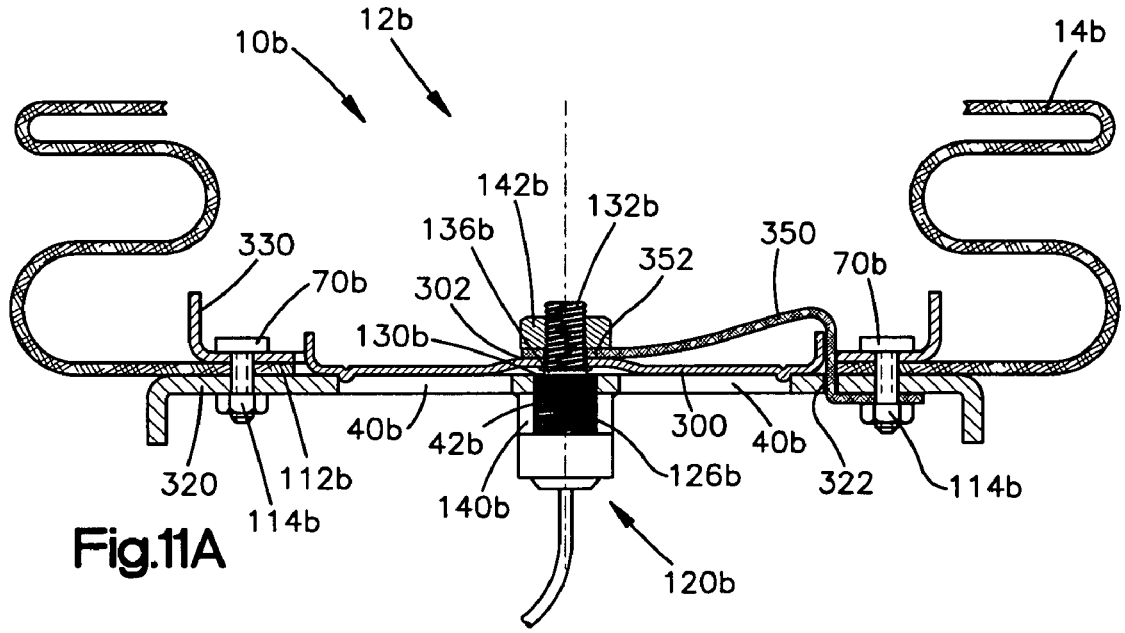
FIGS. 11A and 11B are magnified views of a portion of the apparatus of FIGS. 8-10 illustrating the operation of the apparatus.
Figure 11B:
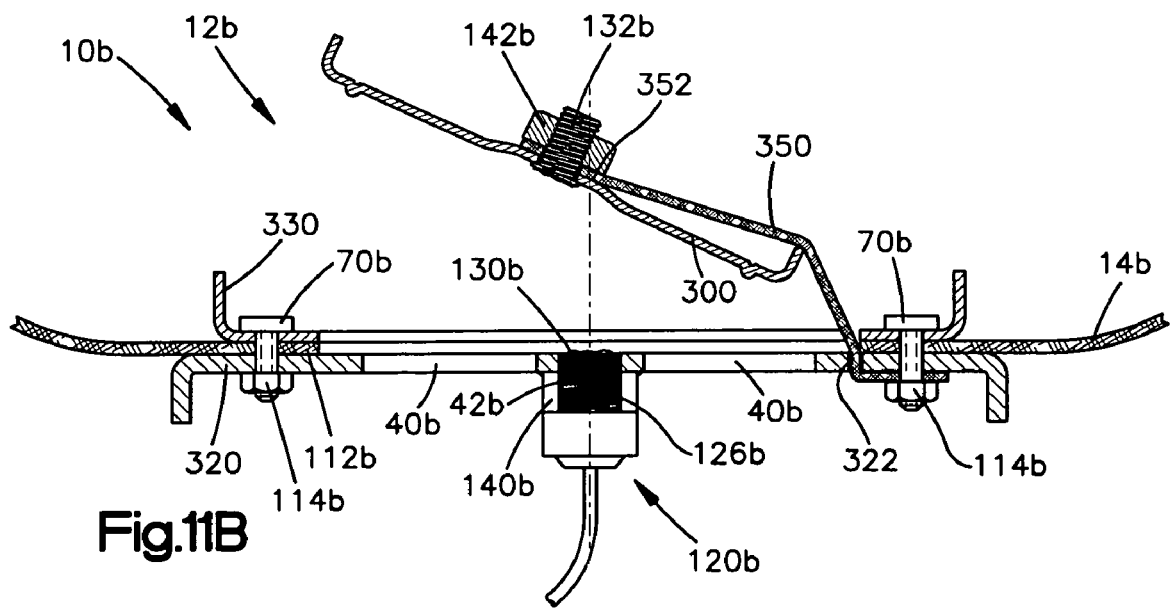

Referring to FIGS. 11A and 11B, in an assembled condition of the air bag module 12a, a mouth portion 112b of the air bag 14b is positioned between the reaction plate 320 and the retainer 330.

Studs 70b extend through aligned openings in the reaction plate 320, air bag 14b, and retainer 330. Nuts 114b are screwed onto studs 70b, which causes the reaction plate 320 and retainer 330 to exert a clamping force on the air bag 14b and the inflator (not shown in FIGS. 11A and 11B). The air bag 14b and inflator are thus secured to the reaction plate 320 via the retainer 330.

The air bag module 12b also includes an actuator 120b for actuating the vent part 300. The actuator 120b may, for example, be an actuatable fastener having a portion secured to the vent part 300 and a portion secured to the reaction plate 320 in a manner similar or identical to the actuator 120 of the first and second embodiments (FIGS. 1-7B), as described above. The actuator 120b could, however, have alternative configurations. For example, the actuator 120b could comprise an electromechanical device, such as a solenoid (not shown). As another example, the actuator 120b could comprise a mechanical device, such as a spring loaded mechanism.

As shown in FIG. 11A, the first shank portion 130b of the actuatable fastener 120b is secured to the reaction plate 320 via a threaded nut or bushing 140b that is connected to the reaction plate by means, such as a weld. The shank 126b extends through the opening 42b in the reaction plate 320. The second shank portion 132b extends through the actuator receiving opening 302 in the vent member 300. A first end portion 352 of the tether 350 is fit over the second shank portion 132b and positioned adjacent the vent member 300. A nut 142b is screwed onto the second shank portion 132b to clamp the tether 350 and the vent member 300 between the shoulder portion 136b and the nut. The vent part 300 and the tether 350 are thus secured to the second shank portion 132b of the actuatable fastener 120b.

The actuatable fastener 120b is actuatable to separate the second shank portion 132b from the first shank portion 130b to thereby move the vent part 300 from the unactuated condition of FIG. 11A to the actuated condition of FIG. 11B. In the unactuated condition, vent part 300 overlies the vent openings 40b and thus helps block fluid flow through the openings. In the actuated condition, the vent part 300 is moved away from the vent openings 40b and thus permits fluid flow through the openings. In the actuated condition, the tether 350 maintains the vent part 300 connected to the reaction plate 320 and, thus, to the air bag module 12b.

Figure 13A:
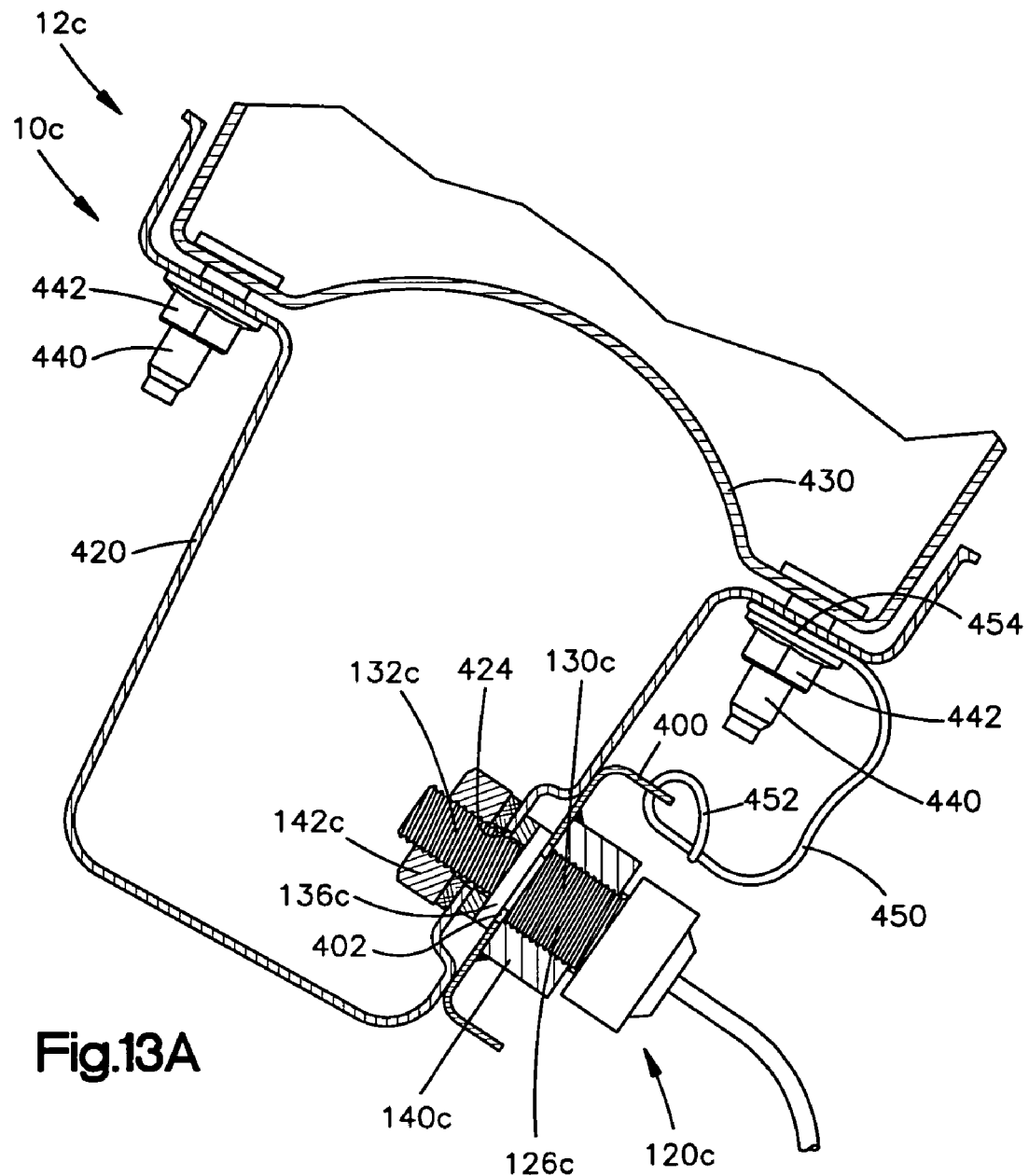
FIGS. 13A and 13B are magnified views of a portion of the apparatus of FIG. 12 illustrating the operation of the apparatus.
Figure 13B:
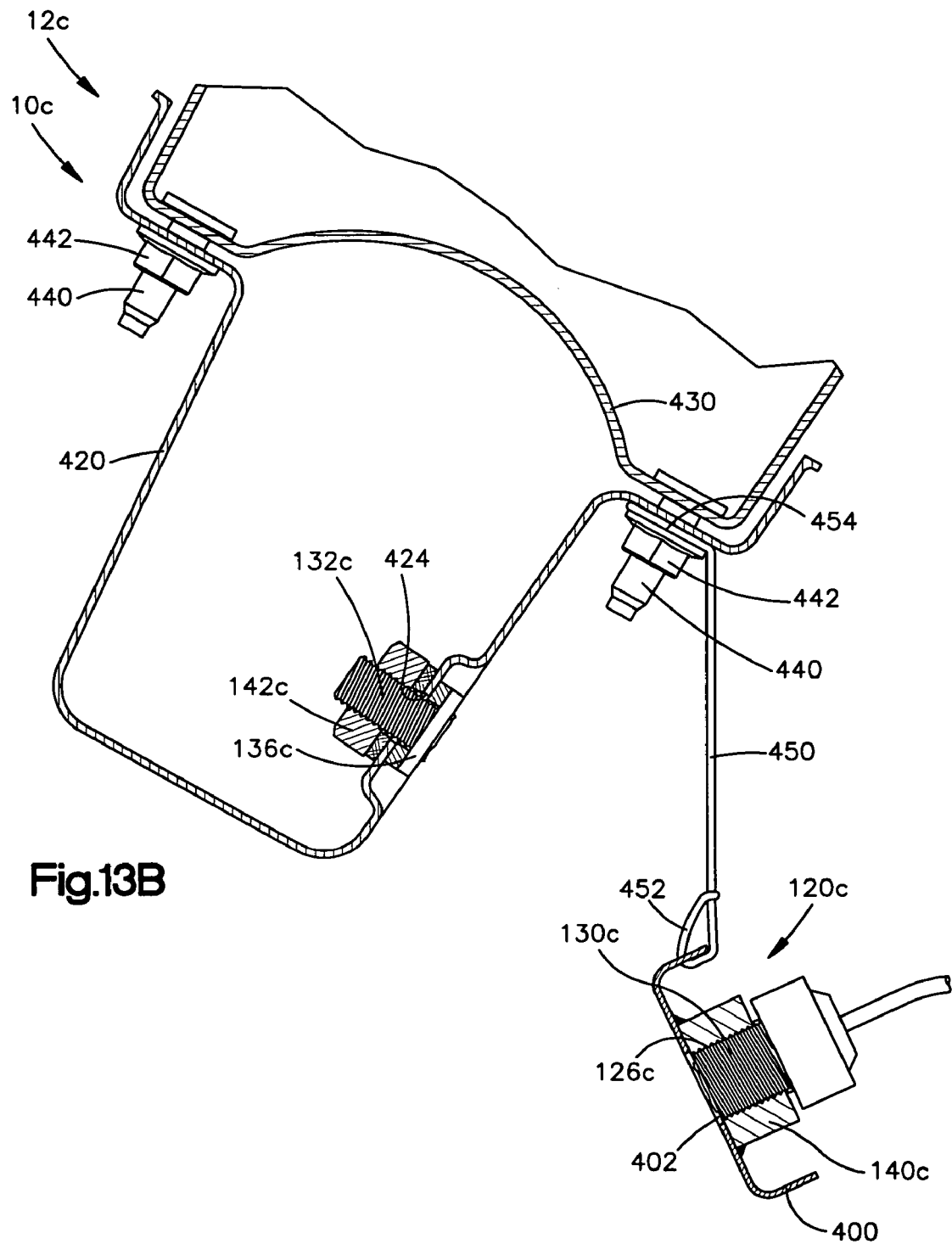

A fourth embodiment of the present invention is illustrated in FIGS. 12-13B. The fourth embodiment of the invention is similar to the embodiment illustrated in FIGS. 8-11B. Accordingly, numerals similar to those of FIGS. 8-11B will be utilized in FIGS. 12-13B to identify similar components, the suffix letter "c" being associated with the numerals of FIGS. 12-13B to avoid confusion.

The fourth embodiment of the present invention differs from the embodiment of FIGS. 8-11B in that the air bag module of the fourth embodiment is a passenger side air bag module whereas the air bag module of the third embodiment is a driver side air bag module. According to the fourth embodiment, the apparatus 10c includes a tether 450 that secures the vent part 400 to the air bag module 12c, e.g., to a canister 420 of the air bag module, which is the passenger side corollary to a driver side reaction plate. The tether 450 may comprise any flexible elongated member, such as a fabric strap, a plastic strap, or a cable, suited to connect the vent part 400 to the air bag module 12c and permit relative movement between the vent part and the module.

Referring to FIGS. 12-13B, the vent part 400 of the air bag module 12c is formed as a single piece of material, such as metal or plastic. The vent part 400 is separate from the canister 420 and a retainer 430 of the air bag module 12c. The canister 420 includes one or more vent openings 422 that the vent part 400 is adapted to cover.

The vent part 400 is adapted for connection to the outside of the canister 420 via the actuator 120c. The vent part 400 has an actuator receiving opening 402 and recessed portions 404 that are configured to correspond to and engage with the vent openings 422 in the canister 420. The configuration of the vent part 400 could, however, be altered, for example, to accommodate a different configuration or arrangement of the vent openings 422.

Referring to FIGS. 13A and 13B, in an assembled condition of the air bag module 12c, studs 440 extend through aligned openings in the canister 420, retainer 430 and air bag (not shown). Nuts 442 are screwed onto studs 440, which exerts a clamping force on the canister 420, retainer 430, and air bag. The canister plate 420, retainer 430, and air bag are thus secured to each other.

The actuator 120c of the air bag module 12c may, for example, be an actuatable fastener having a portion secured to the vent part 400 and a portion secured to the canister 420 in a manner similar or identical to the actuator shown in the embodiments of FIGS. 1-11B, as described above. The actuator 120c could, however, have alternative configurations. For example, the actuator 120c could comprise an electromechanical device, such as a solenoid (not shown). As another example, the actuator 120c could comprise a mechanical device, such as a spring loaded mechanism.

As shown in FIG. 13A, the first shank portion 130c of the actuatable fastener 120c is secured to the vent member 400 via a threaded nut or bushing 140c that is connected to the vent part 400 by means, such as a weld. The shank 126c extends through the actuator receiving opening 402 in the vent member 400. The second shank portion 132c extends through the actuator receiving opening 424 in the canister 420. A nut 142c is screwed onto the second shank portion 132c to clamp the canister 420 between the shoulder portion 136c and the nut.

A first end portion 452 of the tether 450 is secured to the vent member 400 by known means, such as looping the tether through an opening 406 (see FIG. 12) in the vent member. A second end portion 454 of the tether 450 is secured to the canister 420 via one of the stud 440 and nut 442 combinations.

The actuatable fastener 120c is actuatable to separate the second shank portion 132c from the first shank portion 130c to thereby move the vent part 400 from the unactuated condition of FIG. 13A to the actuated condition of FIG. 13B. In the unactuated condition, the recessed portions 404 of the vent part 400 overlie the vent openings 422 and thus helps block fluid flow through the openings. In the actuated condition, the vent part 400 is moved away from the vent openings 422 and thus permits fluid flow through the openings. In the actuated condition, the tether 450 maintains the vent part 400 connected to the canister 420 and, thus, to the air bag module 12c.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a vehicle, said apparatus comprising:
    an inflatable vehicle occupant protection device;
    an inflation fluid source actuatable to provide inflation fluid for inflating the protection device;
    a structure for supporting the protection device in the vehicle, the structure comprising a vent opening for venting inflation fluid from the protection device;
    a vent member connectable to the structure to block inflation fluid flow through the vent opening;
    actuatable means for detaching the vent member from the structure and moving the vent member away from the vent opening to permit inflation fluid flow through the vent opening; and
    a flexible elongated member having a first end connected to the vent member and a second end connected to the structure, the second end of the flexible elongated member being connected to the structure by a fastener that also secures a retainer to the structure, the retainer being for securing the protection device to the structure, the flexible elongated member tethering the vent member to the structure after the vent member is detached from the structure.

2. The apparatus recited in claim 1, wherein the vent member is connected to the structure by the actuatable means.

3. The apparatus recited in claim 1, wherein the actuatable means comprises an actuatable fastener.

4. The apparatus recited in claim 1, further comprising a controller operatively connected with the inflation fluid source and the actuatable means and at least one sensor operatively connected with the controller, the controller being operative selectively to actuate the inflation fluid source and the actuatable means based on at least one signal supplied to the controller from the at least one sensor.

5. The apparatus recited in claim 4, wherein the at least one sensor comprises at least one of a vehicle collision sensor, a vehicle rollover sensor, an occupant position sensor, a seat position sensor, a seat belt latch sensor, a seat weight sensor, and a seat belt tension sensor.

6. The apparatus recited in claim 4, wherein the controller is operative to actuate the actuatable means in response to a signal indicative of a seat belt latched determination.

7. The apparatus recited in claim 4, wherein the controller is operative to maintain the actuatable means in the unactuated condition in response to a signal indicative of a seat belt unlatched determination.

8. The apparatus recited in claim 1, wherein the vent member when moved away from the vent opening is positioned within an inflatable volume of the protection device.

9. The apparatus recited in claim 1, wherein the vent member when moved away from the vent opening is positioned outside an inflatable volume of the protection device.

10. An apparatus for helping to protect an occupant of a vehicle, said apparatus comprising:
    an inflatable vehicle occupant protection device;
    an inflation fluid source actuatable to provide inflation fluid for inflating the protection device;
    a structure for supporting the protection device in the vehicle, the structure comprising a vent opening for venting inflation fluid from the protection device;
    a vent member connectable to the structure to block inflation fluid flow through the vent opening;
    an actuatable fastener for detaching the vent member from the structure and moving the vent member away from the vent opening to permit inflation fluid flow through the vent opening, the actuatable fastener comprising a head and a shank comprising first and second threaded shank portions; and
    a flexible elongated member having a first end connected to the vent member and a second end connected to the structure, the vent member and the first end of the flexible elongated member being secured to one of the first and second shank portions via a first threaded connection, the structure being secured to the other of the first and second shank portions via a second threaded connection, the flexible elongated member tethering the vent member to the structure after the vent member is detached from the structure.

11. The apparatus recited in claim 10, wherein the actuatable fastener is actuatable to rupture the shank and thereby separate the first and second shank portions to detach the vent member from the structure while maintaining the connection between the vent member and the first end of the flexible elongated member via the first threaded connection.

12. An air bag module comprising:
    an air bag;
    a reaction plate including at least one vent opening;
    a retainer connectable with the reaction plate to clamp the air bag between the reaction plate and the retainer;
    a vent part;
    an actuatable fastener having a first portion secured to the reaction plate and a second portion secured to the vent part to thereby connect the vent part to the reaction plate, the actuatable fastener being actuatable to move the vent part away from the at least one vent opening; and
    a tether having a first end portion connected to the vent part and a second end portion connected to the reaction plate, the tether maintaining a flexible connection between the vent member and the reaction plate after the actuatable fastener is actuated.

13. The air bag module recited in claim 12, wherein the first end portion of the tether is secured to the vent part by the second portion of the actuatable fastener.

14. An air bag module comprising:
    an air bag;
    a canister including at least one vent opening;
    a retainer connectable with the canister and securing the air bag to the canister;
    a vent part;
    an actuatable fastener having a first portion secured to the vent part and a second portion secured to the canister to thereby connect the vent part to the canister, the actuatable fastener being actuatable to detach the vent part from the canister and to move the vent part away from the at least one vent opening; and
    a tether having a first end portion connected to the vent part and a second end portion connected to the canister, the second end portion of the tether being connected to the canister by a fastener that also secures the retainer to the canister, the tether serving to tether the vent part to the canister after the vent part is detached from the canister.

15. The air bag module recited in claim 14, wherein the first end portion of the tether is secured to the vent part by looping the first end portion through a tether receiving opening in the vent part.

* * * * *